N. L. G. WHITEHOUSE.
METHOD OF MANUFACTURING PHOSGENE.
APPLICATION FILED JULY 26, 1916.
1,231,226.
Patented June 26, 1917.
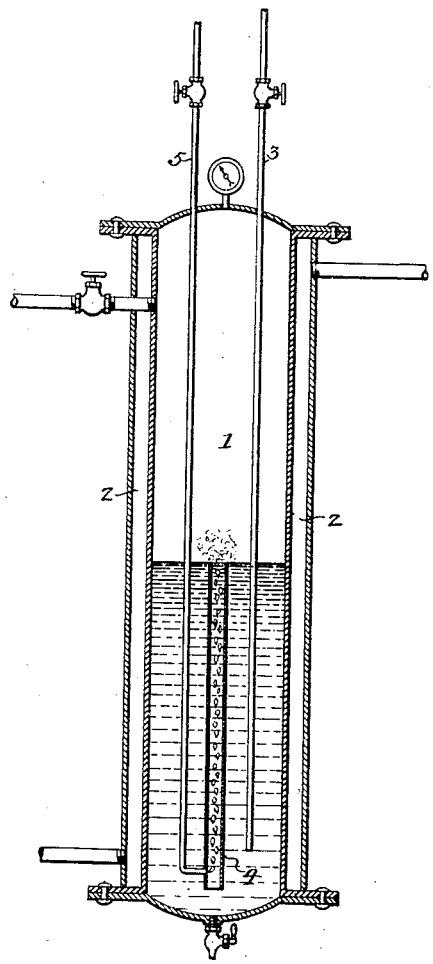
Inventor,
Norman L. G. Whitehouse,
by his Attorneys.
Howson & Howson

UNITED STATES PATENT OFFICE.

NORMAN L. G. WHITEHOUSE, OF PITTSBURGH, PENNSYLVANIA.

METHOD OF MANUFACTURING PHOSGENE.

1,231,226. Specification of Letters Patent. Patented June 26, 1917.

Application filed July 26, 1916. Serial No. 111,408.

*To all whom it may concern:*

Be it known that I, NORMAN L. G. WHITEHOUSE, a subject of the King of Great Britain and Ireland and the Isle of Man, residing in Pittsburgh, Pennsylvania, have invented a Method of Manufacturing Phosgene, of which the following is a specification.

The object of this invention is to produce phosgene (carbonyl chlorid) synthetically from carbon monoxid and chlorin.

The figure of the drawing is a diagrammatic sectional view of one form of apparatus for carrying out my improved process.

I have discovered that phosgene can be manufactured efficiently and with rapidity by causing carbon monoxid gas to come into intimate contact with liquid chlorin. When this is done combination is rapid and certain. This operation may be carried out either at a temperature below minus 34 deg. cent. (the approximate boiling point of liquid chlorin under atmospheric pressure) or at higher temperatures under sufficient pressure to cause the chlorin to assume the liquid state.

I have found it convenient, (but the actual form of apparatus is immaterial so long as carbon monoxid gas can come into contact with chlorin in the liquid state), to use a long cylindrical vessel 1, which is jacketed as at 2, so that it can be conveniently cooled by circulating a cooling medium in connection with an ordinary refrigerator.

Chlorin gas or liquid from any source is allowed to enter through a pipe 3, until the vessel is about half full of liquid chlorin. In the center of the containing vessel an upright tube 4 is fixed, (the diameter of which is about one-tenth of the diameter of the cylindrical containing vessel). This tube 4 does not quite reach the bottom of the containing vessel and extends in an upward direction for about half its length.

The containing vessel now being filled above the level of the top of this tube, carbon monoxid gas is allowed to enter the liquid through a pipe 5, which communicates with the tube 4 at about 1 inch from its bottom end. This causes a rapid circulation of the liquid through the internal tube in the well known manner of the "air lift" at the same time producing an intimate mixture of the carbon monoxid gas and the liquid chlorin which combines to form liquid phosgene. The operation is stopped when no more carbon monoxid is absorbed as shown by the rise of pressure in the containing vessel. Nitric oxid gas is similarly absorbed by liquid chlorin giving nitrosyl chlorid, and it is no disadvantage to have a small percentage of this compound present or the usual impurities present in the chlorin of commerce.

I claim:

1. An improved method of manufacturing phosgene (carbonyl chlorid), said process consisting in subjecting carbon monoxid gas to the action of chlorin in a liquid state.

2. The process herein described of making phosgene (carbonyl chlorid) said process consisting in introducing carbon monoxid gas to the bottom of a vessel containing liquid chlorin and allowing the gas to bubble up through the liquid chlorin until no more carbon monoxid is absorbed.

3. The process herein described of making phosgene (carbonyl chlorid), said process consisting in introducing carbon monoxid gas into a body of liquid chlorin at a temperature below −34 degrees C.

NORMAN L. G. WHITEHOUSE.